(12) United States Patent
Kurz et al.

(10) Patent No.: US 12,468,033 B2
(45) Date of Patent: Nov. 11, 2025

(54) DISTANCE MEASUREMENT BY MEANS OF AN ACTIVE OPTICAL SENSOR SYSTEM

(71) Applicants: Volkswagen Aktiengesellschaft, Wolfsburg (DE); AUDI AG, Ingolstadt (DE)

(72) Inventors: Heiko Kurz, Hannover (DE); Marc-Michael Meinecke, Sassenburg (DE); Christoph Kottke, Berlin (DE); Patrick Runge, Berlin (DE); Pascal Rustige, Berlin (DE); Ronald Freund, Berlin (DE); Michael Schwenkert, Ingolstadt (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 918 days.

(21) Appl. No.: 17/690,811

(22) Filed: Mar. 9, 2022

(65) Prior Publication Data

US 2022/0291381 A1    Sep. 15, 2022

(30) Foreign Application Priority Data

Mar. 10, 2021    (DE) ...................... 10 2021 105 770.1

(51) Int. Cl.
*G01C 3/08*        (2006.01)
*G01S 7/484*       (2006.01)
(Continued)

(52) U.S. Cl.
CPC .............. *G01S 17/34* (2020.01); *G01S 7/484* (2013.01); *G01S 7/4917* (2013.01); *G01S 17/26* (2020.01); *G01S 17/931* (2020.01)

(58) Field of Classification Search
CPC ......... G01S 17/34; G01S 7/484; G01S 7/4917
See application file for complete search history.

(56) References Cited

U.S. PATENT DOCUMENTS 8,705,953 B2    4/2014    Schriefer .......................... 398/9
9,976,843 B2    5/2018    Koos et al.
(Continued)

FOREIGN PATENT DOCUMENTS

DE    102009012646 A1    9/2010
DE    102012001754 A1    8/2013
(Continued)

OTHER PUBLICATIONS

Extended European Search Report, Application No. 22160555.3, 9 pages.
(Continued)

*Primary Examiner* — Mark Hellner
(74) *Attorney, Agent, or Firm* — Slayden Grubert Beard PLLC

(57) ABSTRACT

A method for distance measurement by means of an active optical sensor system is disclosed, comprising: an initial pulse sequence with an initial frequency spectrum, which corresponds to a frequency comb, is generated using a laser source. Based thereon, a first pulse sequence and a first reference pulse sequence with a first frequency spectrum, which corresponds to a first part of the frequency comb, as well as a second pulse sequence and a second reference pulse sequence with a second frequency spectrum, which corresponds to a second part of the frequency comb, are generated. A first distance of the object is determined using a first heterodyne measurement based on the first reference pulse sequence and reflected portions of the first pulse sequence and a second distance is determined using a second heterodyne measurement based on the second reference
(Continued)

pulse sequence and reflected portions of the second pulse sequence.

20 Claims, 5 Drawing Sheets

(51) Int. Cl.
    *G01S 7/4912*     (2020.01)
    *G01S 17/26*     (2020.01)
    *G01S 17/34*     (2020.01)
    *G01S 17/931*     (2020.01)

(56) References Cited

U.S. PATENT DOCUMENTS

| | | | | |
|---|---|---|---|---|
| 2010/0284431 A1* | 11/2010 | Inoue | ................... | H01S 3/0057 372/32 |
| 2011/0157603 A1 | 6/2011 | Alvarez Diez et al. | ...... | 356/614 |
| 2012/0086933 A1 | 4/2012 | Spruck et al. | ............... | 356/5.01 |
| 2013/0004154 A1* | 1/2013 | Schriefer | ................ | G01S 15/36 398/9 |
| 2015/0070685 A1* | 3/2015 | Koos | ......................... | G01P 3/36 356/486 |
| 2017/0254891 A1 | 9/2017 | Malinovskiy | | |
| 2019/0353787 A1 | 11/2019 | Petit | | |

FOREIGN PATENT DOCUMENTS

| | | |
|---|---|---|
| DE | 102019209937 A1 | 1/2021 |
| EP | 2620742 A1 | 7/2013 |
| WO | 2018/050906 A2 | 3/2018 |

OTHER PUBLICATIONS

German Office Action, Application No. 102021105770.1, 8 pages.
Chinese Office Action, Application No. 202210231527.X, 19 pages.

* cited by examiner

DISTANCE MEASUREMENT BY MEANS OF AN ACTIVE OPTICAL SENSOR SYSTEM

CROSS-REFERENCE TO RELATED APPLICATIONS

This application claims priority to German Patent Application No. DE 10 2021 105 770.1, filed on Mar. 10, 2021 with the German Patent and Trademark Office. The contents of the aforesaid Patent Application are incorporated herein for all purposes.

TECHNICAL FIELD

The present invention relates to a method for distance measurement by means of an active optical sensor system, wherein an initial pulse sequence with an initial frequency spectrum corresponding to a frequency comb is generated by means of a laser source, as well as to a corresponding active optical sensor system for distance measurement.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

SUMMARY

A need exist for an improved distance measurement using an active optical sensor system, by which a lower susceptibility to interference by interactions with other light sources may be achieved.

The need is addressed by the respective subject matter of the independent claims. Embodiments of the invention are described in the dependent claims, the following description, and the drawings.

DESCRIPTION

Figure 1:
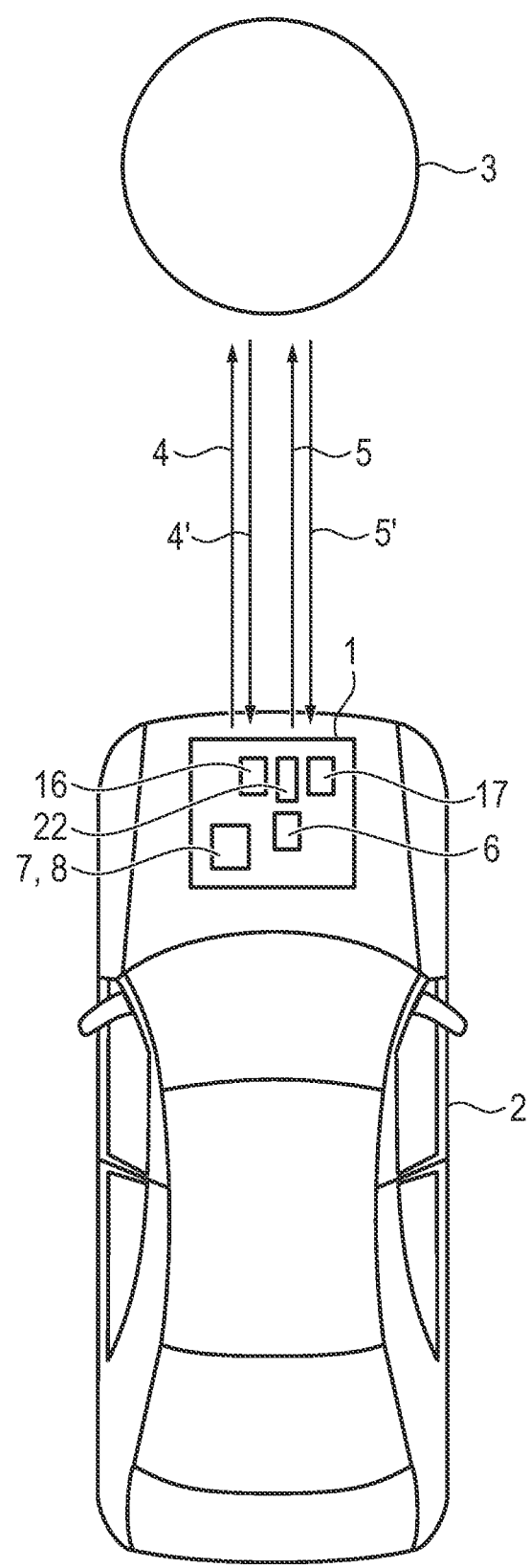
FIG. 1 shows a schematic representation of a motor vehicle with an exemplary embodiment of an active optical sensor system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some embodiments are based on the idea to coherently split a frequency comb into two parts and thus realize two spectrally coded emission channels and detect reflected portions by two separate heterodyne measurements frequency-selectively and coherently.

In some embodiments, a method for distance measurement by means of an active optical sensor system is specified. Therein, an initial pulse sequence, which comprises an initial frequency spectrum corresponding to a frequency comb, is generated by means of a laser source of the active optical sensor system. The frequency comb comprises a plurality of modes with a respective mode frequency. Based on the initial pulse sequence, a first pulse sequence with a first frequency spectrum corresponding to a first part of the frequency comb, as well as a first reference pulse sequence with the first frequency spectrum are generated. Based on the initial pulse sequence, a second pulse sequence with a second frequency spectrum and a second reference pulse sequence with the second frequency spectrum are generated. Therein, the second frequency spectrum corresponds to a second part of the frequency comb different from the first part. The first pulse sequence and the second pulse sequence are emitted towards an object in the environment of the active optical sensor system by means of the active optical sensor system. A first distance of the object from the sensor system is determined by means of at least one first heterodyne measurement based on the first reference pulse sequence and based on portions of the first pulse sequence reflected by the object. A second distance of the object from the sensor system is determined by means of at least one second heterodyne measurement based on the second reference pulse sequence and portions of the second pulse sequence reflected by the object.

Here and in the following, the term "light" may be understood such that electromagnetic waves in the visible range, in the infrared range and/or in the ultraviolet range are encompassed thereof. Accordingly, the term "optical" may also be understood such that it relates to light according to this understanding. Accordingly, a sequence of pulses may be understood as a sequence of light pulses. For example, the laser source is configured to emit light in the infrared spectral range, for example light with a wavelength in a range from 740 nm to 3000 nm or from 740 nm to 2000 nm. If the emitted light, as for example in case of the initial pulse sequence, comprises multiple substantially mono-frequency modes, thus, the emitted wavelength is for example a central wavelength.

According to definition, an active optical sensor system may comprise a light source for emitting light or light pulses, in the present case the laser source. Furthermore, by definition, an active optical sensor system may comprise at least one optical detector to capture reflected portions of the emitted light. For example, the active optical sensor system is configured to generate, process or output one or more sensor signals based on the detected portions of the light. Herein, for performing the first and the second heterodyne measurement, the active optical sensor system for example comprises a respective optical heterodyne detector.

For the first heterodyne measurement, a first heterodyne detector may superimpose the reflected portions of the emitted first pulse sequence on the first reference pulse sequence and photoelectrically measure the superimposed field. A resulting photocurrent is proportional to the beat frequency of the superimposed pulse sequences. The same analogously applies to the second heterodyne measurement by means of a second heterodyne detector of the active optical sensor system.

By the heterodyne measurement, effectively a transition from an optical domain into the electrical domain is performed. By the evaluation of the correspondingly generated detector signals of the heterodyne detectors, a phase difference between the two superimposed pulse sequences may be inferred, which in turn depends on the first and the second distance, respectively, which may be determined in this manner.

Here and in the following, a plurality of consecutive light pulses, for example with substantially identical pulse width, pulse height and distance between the consecutive light pulses, may for example be understood by a "pulse sequence". Such a pulse sequence may for example be achieved by coherent superposition of the plurality of modes with their corresponding mode frequencies, wherein the mode frequencies of adjacent modes each have a substantially constant distance to each other, which corresponds to a repetition frequency of the emitted pulse sequence.

The pulse width of the consecutive light pulses sets the spectral range of the frequency comb, thus the width of the frequency comb, and the length of the pulse train, thus the number of the consecutive light pulses of the pulse sequence, sets the spectral width of the individual modes in the frequency domain. Thus, the frequency comb corresponds to a plurality of equidistant, substantially monofrequency modes with a constant phase relation to each other.

For generating the first part and the second part of the frequency comb and for example the first pulse sequence and the second pulse sequence as well as the first and the second reference pulse sequence, the initial pulse sequence may be spectrally split such that the frequency comb is thus split into the two corresponding parts. Beneficially, these split parts of the frequency comb maintain their defined phase relation, such that the first and the second pulse sequence are coherent, thus for example phase-stable and synchronous to each other. The same applies to the first and the second reference pulse sequence as well as to the first reference pulse sequence with respect to the first pulse sequence and the second reference pulse sequence with respect to the second pulse sequence.

For example, the first part of the frequency comb only contains modes, which the second part does not contain, and vice versa. For generating the first and the second pulse sequence as well as the first and the second reference pulse sequence, the initial pulse sequence may for example be filtered frequency-dependently such that two partial combs with different frequency ranges phase-stable and synchronous to each other arise, which may each in turn be spatially split to respectively generate a pulse sequence and an associated reference pulse sequence.

For example, for automatic or partially automatic driving functions in motor vehicles, an environmental perception as safe as possible is of high importance. Therein, the vehicle environment may generally be captured with the aid of sensors, such as for example radar sensors, lidar sensors and/or cameras. For instance, an integral and for example three-dimensional capture of the environment may be of particular relevance such that all of the relevant static and dynamic objects may be registered. Therein, distances may be measured and object classifications may also be performed for example based on the corresponding sensor data of lidar sensor systems.

Known lidar sensor systems are for example based on the principle of the light time-of-flight measurement, also referred to as ToF measurement. Therein, the light time of flight of a light pulse is measured, which is emitted by the lidar system, reflected in the environment and then in turn detected by the lidar system, to determine the traveled distance of the light pulse. The maximum range correlates with the number of the detected photons and thereby with the number of the photons reflected from the surface of an object in the environment. The more photons are reflected and detected, with the higher probability and accuracy, respectively, the object is detected.

Since the number of the emitted photons per laser pulse scales linearly with the emitted power, the range may be increased in that the power of the emitted pulses is increased. With increasing emitted power, however, the harmful influence of coherent laser radiation and for example the risk of eye damage, for example of passers-by, may also increase. In turn, in order to counteract that, the beam diameters of the emitted laser beams could be enlarged, but which would for example reduce the spatial perceptivity of the system.

Other lidar sensor systems are based on a frequency modulation of the emitted light. Therein, similar to FMCW radar systems, frequency ramps are emitted, and the reflected radiation is converted into the low-frequency range by a local oscillator. However, the generation of frequency ramps in the range between 100 THz and 400 THz makes high requirements to the stability of the laser systems to provide the frequency ramps in low-noise manner and in the required signal quality. Thus, the frequency has to be modulated as stably as possible for a fine distance resolution, which may for example be realized by the modulation of the laser wavelength. Considerable quality requirements to the used lasers and optics result from it, which results in high cost.

Further, it is possible to determine the traveled path of the reflected light via a frequency and phase measurement. Herein, a phase measurement is unique only in a very small distance interval with typically used wavelengths in the infrared range.

Known lidar systems may be failure-prone, for example upon interactions with other lidar systems or other emission sources. Thus, so-called ghost targets may for example occur as interactions with spatially adjacent systems, for example systems employed in a further vehicle.

In some embodiments, the first pulse sequence and the second pulse sequence are generally emitted from the optical sensor system into the environment at different spatial positions and the first and the second heterodyne detector are also at different spatial positions. Accordingly, the first distance may be different from the second distance. In that the spatial relations of the exit positions of the first and the second pulse sequence as well as the spatial positions of the heterodyne detectors are known, however, the first and the second distance are always in a defined relation to each other.

By generating the first and the second pulse sequence based on the initial pulse sequence as described, effectively two spectrally encoded emission channels are realized, which may also be configured as two different transmitting units of the active optical sensor system, wherein a first transmitting unit for example emits the first pulse sequence and the second transmitting unit emits the second pulse sequence. Therefore, the first and the second pulse sequence may for example be emitted spatially separated from each other.

By the first and the second reference pulse sequence, a coherent detection of the reflected portions of the first and the second pulse sequence may be achieved based on the first and the second heterodyne measurement. For example, both reflected portions of the first pulse sequence and reflected portions of the second pulse sequence generally are incident on both heterodyne detectors. In that the two heterodyne measurements are performed with different reference pulse sequences, thus, in other words, the two heterodyne detectors are fed by different local oscillators, an effective filtering of the reflected portions may be achieved since only the spectral portions corresponding to the respective reference pulse sequence are respectively detected by the respective heterodyne detector.

By encoding the two emission channels, a susceptibility to interference of the distance measurement due to further light sources in the environment of the active optical sensor system may be reduced. Due to the coherent generation and detection of the pulse sequences, a random correlation with optical interference sources may be nearly excluded. If the active optical sensor system is for example part of a sensor system of a motor vehicle, thus, it becomes therefore possible by the spectral coding to identify radiation of lidar systems or the like, which are mounted on other motor vehicles in the environment, as such and to discard it.

In some embodiments, the first pulse sequence and the first reference pulse sequence are generated such that the first part of the frequency comb includes modes of the frequency comb, the respective mode frequencies of which are smaller than a preset limit frequency. For example, the first part of the frequency comb includes only modes, for example all of the modes, of the frequency comb, the mode frequencies of which are smaller than the limit frequency. The second part of the frequency comb includes modes of the frequency comb, the mode frequencies of which are each greater than the limit frequency. For example, the second part of the frequency comb includes only modes, for example all of the modes, the mode frequencies of which are greater than the limit frequency.

If the limit frequency should correspond to a mode frequency of the modes of the frequency comb, thus, the corresponding mode may either be part of the first part or part of the second part of the frequency comb.

In some embodiments, the initial pulse sequence is filtered frequency-dependently, for example by means of an optical system of the active optical sensor system, to generate a first intermediate pulse sequence with the first frequency spectrum and a second intermediate pulse sequence with the second frequency spectrum.

In some embodiments, the first intermediate pulse sequence is split into the first pulse sequence and the first reference pulse sequence, for example by means of the optical system, for example by means of a beam splitter of the optical system.

In some embodiments, the second intermediate pulse sequence is split into the second pulse sequence and the second reference pulse sequence, for example by means of the optical system, for example by means of a second beam splitter of the optical system.

By the frequency-dependent filtering followed by splitting the intermediate pulse sequences, the first and the second pulse sequence may be generated correspondingly phase-stable and synchronous to each other.

In some embodiments, a first phase difference between a mode of the first reference pulse sequence and a mode of the portions of the first pulse sequence reflected by the object is determined by the first heterodyne measurement, and the first distance is determined depending on the first phase difference, for example by means of an evaluation circuit (e.g., hardware and/or software) of the active optical sensor system.

In some embodiments, a second phase difference between a mode of the second reference pulse sequence and a mode of the portions of the second pulse sequence reflected by the object is determined by the second heterodyne measurement, and the second distance is determined depending on the second phase difference, for example by means of the evaluation circuit.

For example, the first and the second distance, respectively, may be determined according to the correlation $L=c*\Phi/(4\pi f_D)$, which results from the measurement principle of the heterodyne measurement. Therein, L corresponds to the first and the second distance, respectively, c corresponds to the speed of light, $\Phi$ corresponds to the respective phase difference, thus the first and/or the second phase difference, and $f_D$ corresponds to a frequency difference of the two measured modes, thus a difference between the mode frequency of the mode of the first reference pulse sequence and the mode of the reflected portions of the first pulse sequence and a difference between the mode frequency of the mode of the second reference pulse sequence and the mode of the reflected portions of the second pulse sequence, respectively.

Since the individual modes of the first pulse sequence and the first reference pulse sequence and of the second pulse sequence and the second reference pulse sequence, respectively, are generated respectively coherent and synchronous to each other, the modes in question have a known and constant frequency relation to each other, thus, the difference in the mode frequencies is approximately independent of time. The described first heterodyne measurement and the described second heterodyne measurement may also be performed for different pairs of modes analogously as described such that a more accurate determination of the first and the second distance, for example by averaging or the like, is achievable.

In some embodiments, a respective first phase difference and a respective frequency difference of the concerned mode frequencies are determined by the at least one first heterodyne measurement for a plurality of first mode pairs. Therein, each of the first mode pairs is composed of a mode of the first reference pulse sequence and a mode of the portions of the first pulse sequence reflected by the object. The first distance is determined by linear approximation of the first phase differences as a function of the first frequency differences, for example by means of the evaluation circuit.

In some embodiments, a respective second phase difference and a respective frequency difference of the concerned mode frequencies are determined by the at least one second heterodyne measurement for a plurality of second mode pairs. Therein, each of the second mode pairs is composed of a mode of the second reference pulse sequence and a mode of the portions of the second pulse sequence reflected by the object. The second distance is determined by linear approximation of the second phase differences as a function of the second frequency differences, for example by means of the evaluation circuit.

By the potentially very high number of the available modes and correspondingly the very high number of the available first and second mode pairs, a highly precise determination of the first and the second distance may be determined by the linear approximation by means of a corresponding optimization method for filtering the linear correlation in this manner in some embodiments.

For example, the frequency comb and the first and the second part of the frequency comb, respectively, may include thousands of modes or more such that the plurality of mode pairs, which are measured by means of the first and the second heterodyne measurement, respectively, may also include thousands or more mode pairs.

In some embodiments, the initial pulse sequence is generated with a preset repetition frequency, which is in a range from 1 kHz to 1 GHz, for example in a range from 100 kHz to 500 MHz, for example in a range from 500 kHz to 100 MHz.

Therein, the repetition frequency for example corresponds to the frequency distance of two adjacent modes within the frequency comb and thus to the inverse temporal distance between two consecutive light pulses of the initial pulse sequence, for example between the respective maximums of the envelope of the consecutive light pulses.

In some embodiments, the initial pulse sequence is generated with a central wavelength in a range from 740 nm to 2000 nm.

Therein, the central wavelength for example corresponds to the wavelength of a center of the envelope in the frequency space. In such pulse sequences, the frequency corresponding to the central wavelength is in the three-digit THz range, but the frequency distance of adjacent modes is in the one- to three-digit MHz range or below. Since downmixing into the electrical domain is effected within the scope of the heterodyne measurements by the coherent superposition of the correspondingly used pulse sequences, the evaluation circuit only has to process signals with frequencies in the MHz range or below. Thereby, a far more inexpensive realization of the active optical sensor system and/or a more accurate measurement may be achieved.

A pulse duration of the light pulses of the initial pulse sequence may for example be in the ns to ps range. For example in the employment of mode-locked lasers as a laser source, the pulse duration is practically determined by the number of the coherently overlapping modes. Since the number of the modes of the frequency comb corresponds to the ratio of the inverse repetition frequency to the pulse sequence, a frequency comb with several thousand or several ten thousand modes is realistic.

According to some embodiments, an active optical sensor system, for example an active optical sensor system for a motor vehicle, for distance measurement is provided. The active optical sensor system comprises a laser source as well as a control circuit (e.g., hardware and/or software), which is configured to control the laser source for generating an initial pulse sequence with an initial frequency spectrum corresponding to a frequency comb. The active optical sensor system comprises an optical system, which is configured and arranged to generate a first pulse sequence with a first frequency spectrum, which corresponds to a first part of the frequency comb, and a first reference pulse sequence with the first frequency spectrum based on the initial pulse sequence. The optical system is configured and arranged to generate a second pulse sequence with a second frequency spectrum, which corresponds to a second part of the frequency comb different from the first part, and a second reference pulse sequence with the second frequency spectrum based on the initial pulse sequence. The optical system is configured and arranged to emit the first pulse sequence and the second pulse sequence towards an object in an environment of the active optical sensor system, for example of the motor vehicle. The active optical sensor system comprises a first heterodyne detector, which is configured and arranged to generate a first electrical signal based on the first reference pulse sequence and based on portions of the first pulse sequence reflected by the object. The active optical sensor system comprises a second heterodyne detector, which is configured and arranged to generate a second electrical signal based on the second reference pulse sequence and on portions of the second pulse sequence reflected by the object. The sensor system additionally comprises an evaluation circuit, which is configured to determine a first distance of the object from the sensor system depending on the at least one first electrical signal and to determine a second distance of the object from the sensor system based on the at least one second electrical signal.

The optical system may include one or more components for optical beam guidance, one or more optical filters, beam splitters, light guides, lenses, mirrors and so on.

In some embodiments of the active optical sensor system, the laser source includes a mode-locked laser.

By the mode-locked laser, the initial pulse sequence may be directly generated by coherent superposition of a plurality of laser modes.

In some embodiments, the laser source may also comprise one or more continuous wave lasers, also referred to as CW lasers, and one or more modulator units to modulate the light emitted by the continuous wave laser or lasers and to thereby generate the initial pulse sequence. For optical modulation, Mach-Zehnder modulators and/or acousto-optical modulators are for example possible.

In some embodiments, the optical system comprises an optical filter, which is configured and arranged to filter the initial pulse sequence frequency-dependently to generate a first intermediate pulse sequence with the first frequency spectrum and to generate a second intermediate pulse sequence with the second frequency spectrum.

For example, the optical system is configured and arranged to generate the first pulse sequence based on the first intermediate pulse sequence and the second pulse sequence based on the second intermediate pulse sequence.

In some embodiments, the optical system comprises a first beam splitter, which is arranged to split the first intermediate pulse sequence into the first pulse sequence and the first reference pulse sequence. Alternatively or additionally, the optical system comprises a second beam splitter, which is arranged to split the second intermediate pulse sequence into the second pulse sequence and the second reference pulse sequence.

Some embodiments of the active optical sensor system directly follow from the different forms of configuration of the method discussed herein and vice versa. For example, an active optical sensor system may be configured to perform the method according to the teachings herein or it performs such a method.

In some embodiments, a motor vehicle is provided, on which an active optical sensor system according to the teachings herein is mounted.

The invention also includes the combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

In FIG. 1, a motor vehicle 2 is schematically illustrated, which comprises an exemplary embodiment of an active optical sensor system 1.

Figure 2:
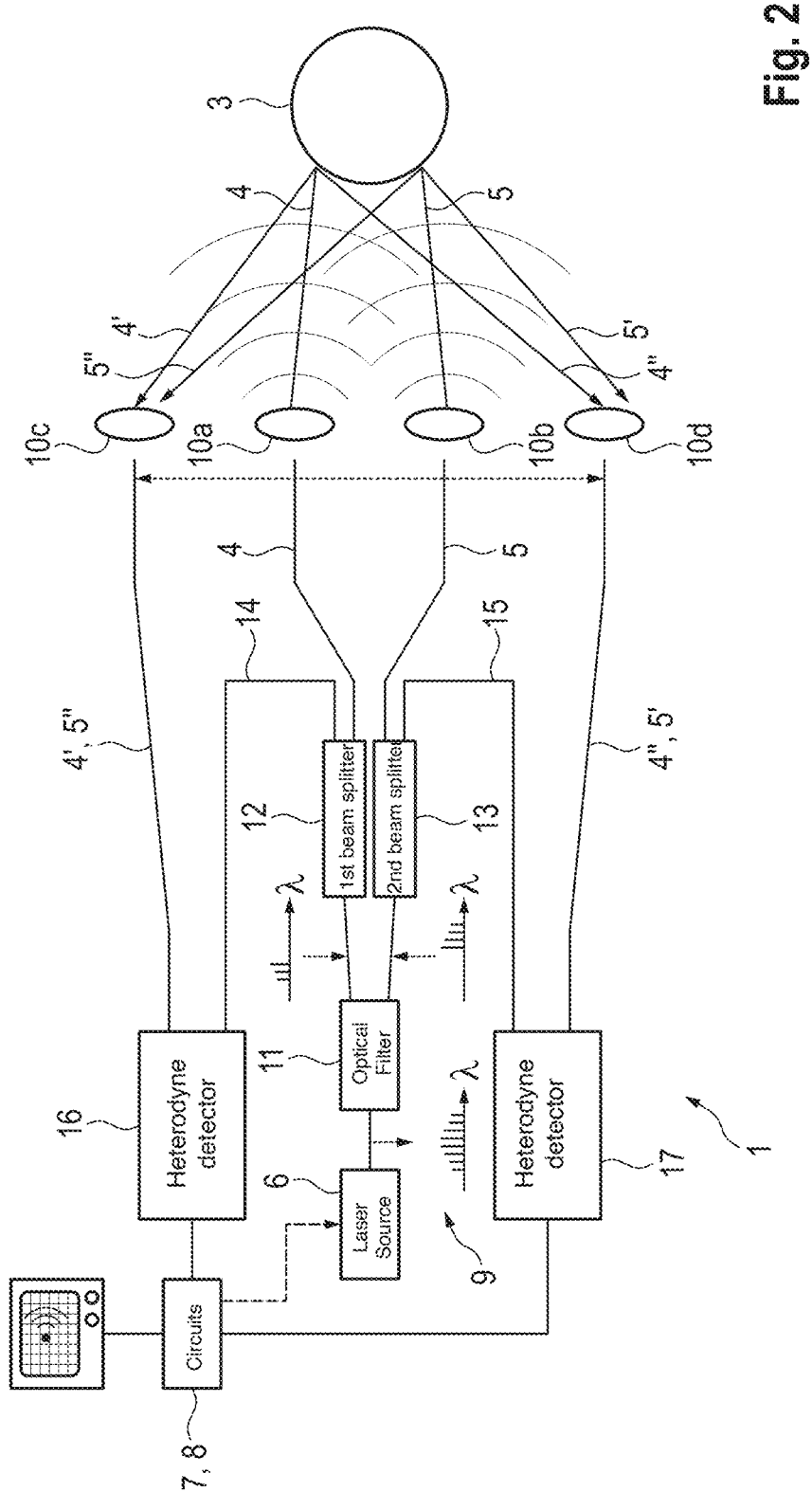
FIG. 2 shows a schematic block diagram of a further exemplary embodiment of an active optical sensor system.
Figure 3:
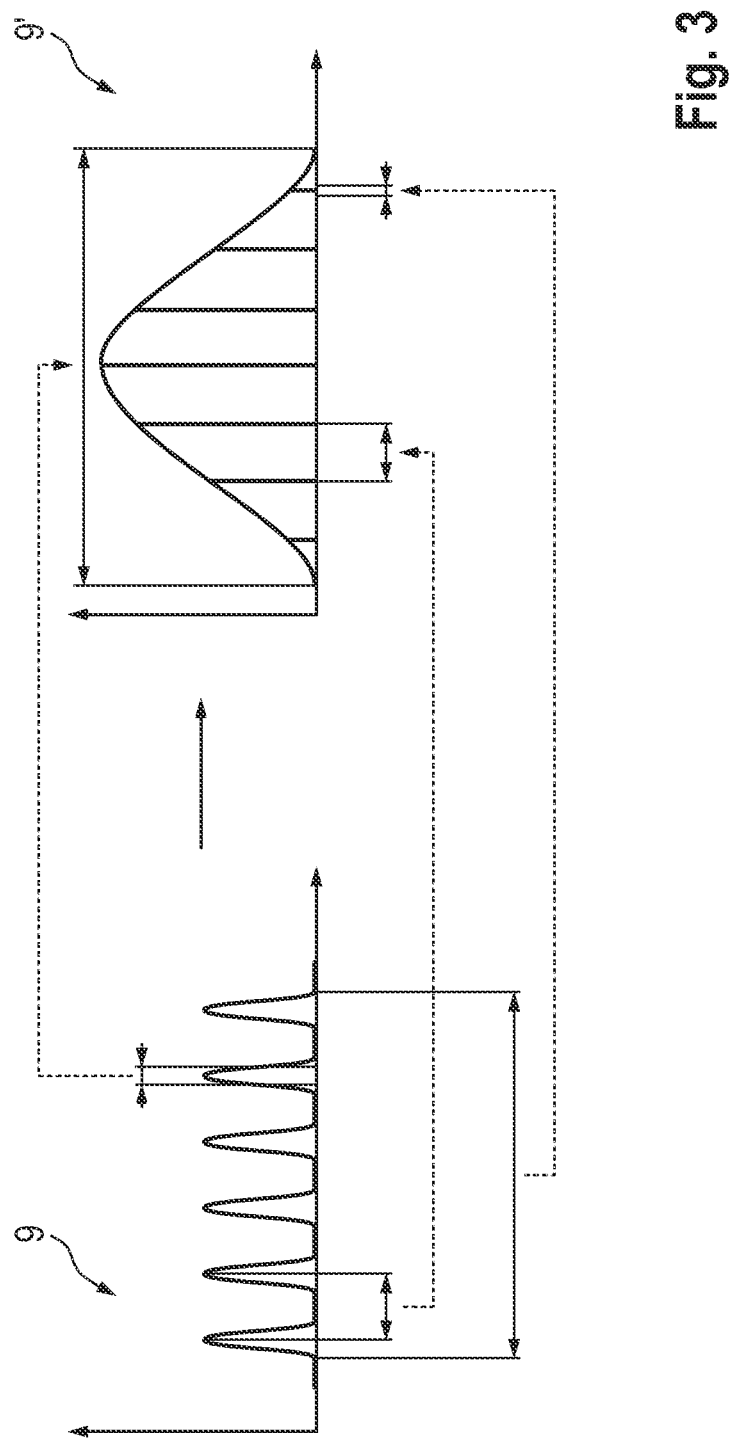
FIG. 3 shows an initial pulse sequence as well as an associated frequency spectrum.

The sensor system 1 includes a laser source 6, for example an infrared laser source, and a control circuit (herein a processor with suitable programming) 7, which is coupled to the laser source 6 to control it such that the laser source 6 generates an initial pulse sequence 9 with an initial frequency spectrum 9' as schematically illustrated in FIG. 3. The sensor system 1 additionally comprises an optical system 22 to generate a first pulse sequence 4 and a second pulse sequence 5 based on the initial pulse sequence 9 and to emit them into the environment of the motor vehicle 2 towards an object 3. Therein, the first pulse sequence 4 may comprise a first frequency spectrum, which corresponds to a first part of the frequency comb, and the second pulse sequence 5 may comprise a second frequency spectrum, which corresponds to a second part of the frequency comb. Moreover, the optical system 22 is configured to generate a first reference pulse sequence 14 with the first frequency spectrum and a second reference pulse sequence 15 (see FIG. 2) with the second frequency spectrum.

In the environment of the motor vehicle 2, the emitted pulse sequences 4 may be at least partially 5 reflected by the object 3 and correspondingly reflected portions 4', 5' may be detected by means of the sensor system 1. Hereto, the sensor system 1 comprises a heterodyne detector 16 and a second heterodyne detector 17.

The first heterodyne detector 16 obtains the first reference pulse sequence 14 as a local oscillator signal and may therefore generate a first electrical signal based on the first reference pulse sequence 14 and the reflected portions 4' of the first pulse sequence 4 by a heterodyne measurement, whereas the first heterodyne detector 16 does not detect optionally received reflected portions of the second pulse sequence 5 due to the deviating frequency spectra by the use of the first reference pulse sequence as the local oscillator signal.

Analogously thereto, the second heterodyne detector 17 obtains the second reference pulse sequence 15 as the local oscillator signal and may generate a second electrical signal based on the second reference pulse sequence 15 and the reflected portions 5' of the second pulse sequence 5 by a further heterodyne measurement. In contrast, the second heterodyne detector 17 does not detect optionally received reflected portions of the first pulse sequence 4.

In addition, the sensor system comprises an evaluation circuit 8, which is coupled to the heterodyne detectors 16 and 17 to obtain the first and the second electrical signal. The evaluation circuit 8 of this embodiment comprises a processor with software that is configured to determine a first distance of the object 3 from the sensor system 1 depending on the first electrical signal and a second distance of the object 3 from the sensor system 1 depending on the second electrical signal.

In various forms of configuration, the sensor system 1 may comprise a common control and evaluation circuit, which includes both, the control circuit 7 and the evaluation circuit 8 and has the functionalities thereof, respectively.

In FIG. 2, an exemplary embodiment of an active optical sensor system 1 is schematically illustrated, as it may for example be employed for a motor vehicle 2 as illustrated in FIG. 1.

In this embodiment, the laser source 6 is for example configured as a mode-locked laser and may therefore directly generate a plurality of laser modes in coherent manner to generate the initial pulse sequence 9.

In this embodiment, the optical system 22 for example comprises an optical filter 11, which obtains the initial pulse sequence 9 on the input side and may filter it frequency-dependently to generate a first intermediate pulse sequence with the first frequency spectrum and a second intermediate pulse sequence with the second frequency spectrum. The optical system 22 for example comprises a first beam splitter 12 and a second beam splitter 13. The first beam splitter 12 obtains the first intermediate pulse sequence from the optical filter 11 and coherently splits it into the first pulse sequence 4 and the first reference pulse sequence 14. Analogously, the second beam splitter 13 obtains the second intermediate pulse sequence from the optical filter 11 and coherently splits it into the second pulse sequence 12 and the second reference pulse sequence 15.

The optical system 22 may for example comprise a first lens unit 10a, by means of which the first pulse sequence 4 may be emitted into the environment. Accordingly, the optical system may also contain a second lens unit 10b, by means of which it may emit the second pulse sequence 5 into the environment. Therein, the first and the second lens unit 10a, 10b may be arranged at spatially different positions such that the first and the second pulse sequence 4, 5 exit from the sensor system 1 at different positions.

As already mentioned, the first pulse sequence and the second pulse sequence 5 may be at least partially reflected on the object 3. For receiving the corresponding reflected portions, the optical system 22 may comprise a third lens unit 10c and a fourth lens unit 10d, which may also be arranged at different spatial positions. In this manner, the sensor system 1 may for example receive first reflected portions 4' or the first pulse sequence 4 via the third lens unit 10c and first reflected portions 5' of the second pulse sequence 5 via the fourth lens unit 10d. Moreover, the sensor system 1 may also receive second reflected portions 5" of the second pulse sequence via the third lens unit 10c and second reflected portions 4" of the first pulse sequence 4 via the fourth lens unit 10d.

The first heterodyne detector 16 now obtains the first reference pulse sequence 14 as the local oscillator signal and the first reflected portions 4' of the first pulse sequence 4 detected by means of the third lens unit 10c as well as the second reflected portions 5" of the second pulse sequence 5 as the measurement signal. Analogously, the second heterodyne detector 17 obtains the second reference pulse sequence 15 as the local oscillator signal and the first reflected portions 5' of the second pulse sequence 5 as well as the second reflected portions 4" of the first pulse sequence 4 as the measurement signal.

By this selection of the local oscillator signals, an inherent filtering of the measurement signals is effected in the heterodyne detectors 16, 17. Since the first reference pulse sequence 14 comprises the first frequency spectrum, but the second reflected portions 5" of the second pulse sequence 5 comprise the second frequency spectrum, which for example does not overlap with the first frequency spectrum, the second reflected portions 5" are filtered out as undesired portions. The same applies to the heterodyne measurement by means of the second heterodyne detector 17.

In FIG. 3, as already mentioned, the initial pulse sequence 9 and the corresponding initial frequency spectrum 9' are schematically illustrated. As indicated, a spectral bandwidth of the individual modes of the initial frequency spectrum 9' corresponds to the inverse time period of the pulse train formed by the initial pulse sequence 9. The repetition frequency, thus the inverse time period between two consecutive light pulses, corresponds to the distance of two adjacent modes in the frequency space. The pulse duration of a light pulse of the initial pulse sequence 9 finally corresponds to the inverse spectral bandwidth of the entire initial frequency spectrum 9'.

Figure 4:
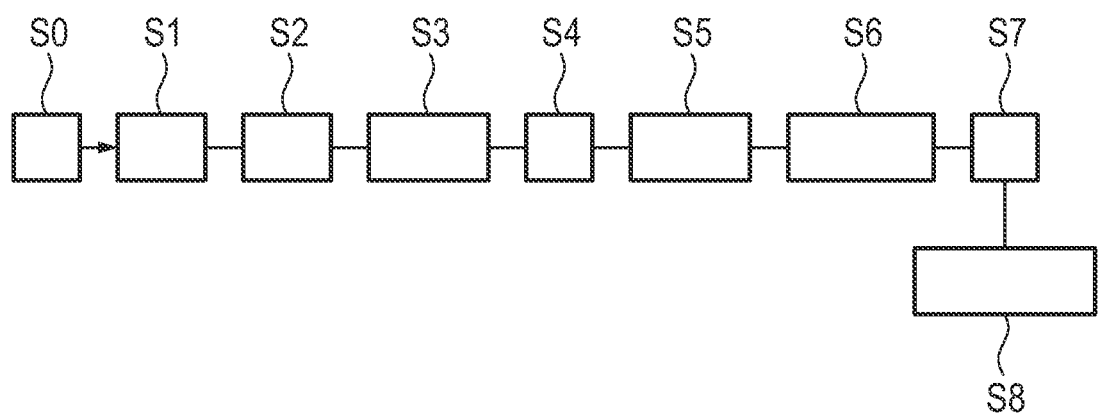
FIG. 4 shows a schematic flow diagram of an exemplary embodiment of a method according to the teachings herein.

In FIG. 4, a flow diagram of an exemplary embodiment of a method for distance measurement by means of an active optical sensor system 1 is schematically illustrated. In step S0 of the method, as described with respect to FIG. 2, the first and the second pulse sequence 4, 5 are emitted, the corresponding reflected portions 4', 4", 5', 5" are received and detected by the heterodyne detectors 16, 17. Accordingly, the heterodyne detectors 16, 17 generate corresponding electrical output signals and communicate them to the evaluation circuit 8. The electrical output signals may for example be converted into corresponding digital signals by means of the evaluation circuit 8. The steps S1 to S8 may be construed as digital signal processing steps by means of the evaluation circuit 8.

In step S1, the evaluation circuit 8 performs a pulse selection for the evaluation. Therein, the number of the pulses is freely selectable. The more pulses are used for the evaluation, the lower the spectral pulse width of an individual mode is as described above. The optional step S2 corresponds to first gating or a first digital filtering step. Here, undesired static reflections may be removed from the measurement signal. The optional step S3 may correspond to second gating or a second digital filtering step. Here, the noise outside of the expected pulses may for example be removed from the measurement signal. In step S4, a Fourier transformation of the digital signals may be performed.

In the optional step S5, a center frequency of the corresponding frequency spectrum of the measurement signal may be determined. By comparison to the center frequency of the corresponding local oscillator signal, a relative speed of the object 3 to the sensor system 1 may be calculated.

In step S6, the respective comb position of the respective measurement signal and of the respective local oscillator signal may be determined, and the phase positions thereof to each other may be determined. In step S7, an average phase shift may for example be determined based thereon. In step S8, the corresponding distance of the object may be correspondingly determined based on the average phase shift.

Figure 5:
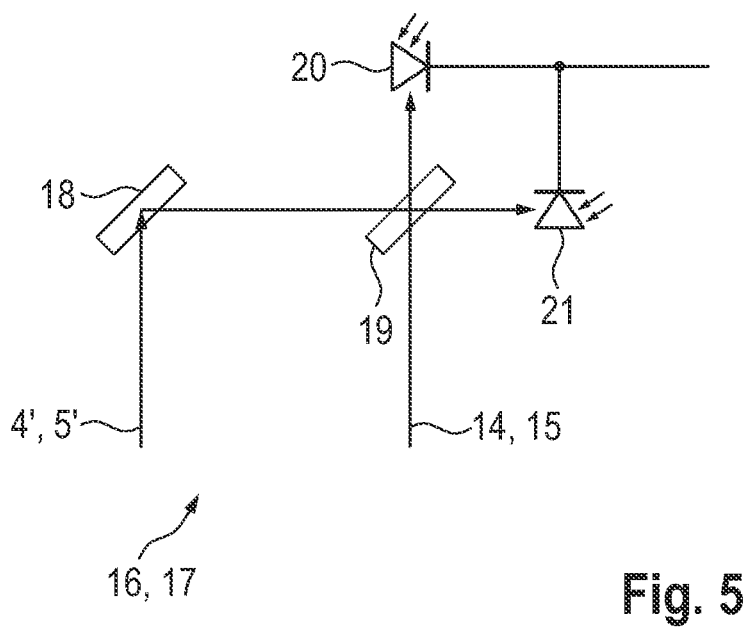
FIG. 5 shows a schematic representation of an exemplary embodiment of a heterodyne detector.

In FIG. 5, the principle of a heterodyne measurement by means of one of the heterodyne detectors 16, 17 is schematically illustrated.

The respective heterodyne detector 16, 17 for example comprises a mirror 18 and a beam splitter 19. In addition, the heterodyne detector 16, 17 may comprise a first optical detector 20 and a second optical detector 21. The optical detectors 20, 21 may for example be configured as photodiodes.

The respectively relevant reflected portions 4', 5', thus the first reflected portions 4' of the first pulse sequence 4 in case of the first heterodyne detector 16 and the first reflected portions 5' of the second pulse sequence 5 in case of the second heterodyne detector 17, are passed to the beam splitter 19 via the mirror 18. The respective local oscillator signal, thus the first reference pulse sequence 14 in case of the first heterodyne detector 16 and the second reference pulse sequence 15 in case of the second heterodyne detector 17, is also passed to the beam splitter 19, for example such that it includes an angle of 90° with the respective measurement signal. Accordingly, the optical detectors 20, 21 are arranged with respect to the beam splitter 19 such that they each receive a coherent superposition of the respective measurement signal on the respective local oscillator signal. By the reflection on the beam splitter 19, an additional phase jump by 180° occurs.

At the output of the heterodyne detector 16, 17, a difference of the two photocurrents of the optical detectors 20, 21 may then be measured. Therein, a component of the photocurrent, which is based on superposition of a certain mode of the measurement signal on a certain mode of the local oscillator signal, is proportional to $\cos(2\pi f_D t + \Phi)$. Therein, $f_D$ represents the frequency difference of the two modes, $\Phi$ represents their phase difference and t denotes the time.

This means that the frequency differences in the frequency space are detectable. Since the initial frequency comb is generally composed of thousand or more modes, the possibility of performing a plurality of measurements arises, wherein $\Phi = 4\pi f_D L/c$ respectively applies. The measured phase and frequency differences are thus in a linear relation, wherein the distance L corresponds to the slope. By linear approximation, the respective distance may be highly precisely determined due to the plurality of the measured frequency and phase differences by means of an optimization method, thus by means of a linear fit. Moreover, the measurement of the Doppler shift of the downmixed carrier frequency allows the optional determination of the speed of the object 3.

Figure 6:
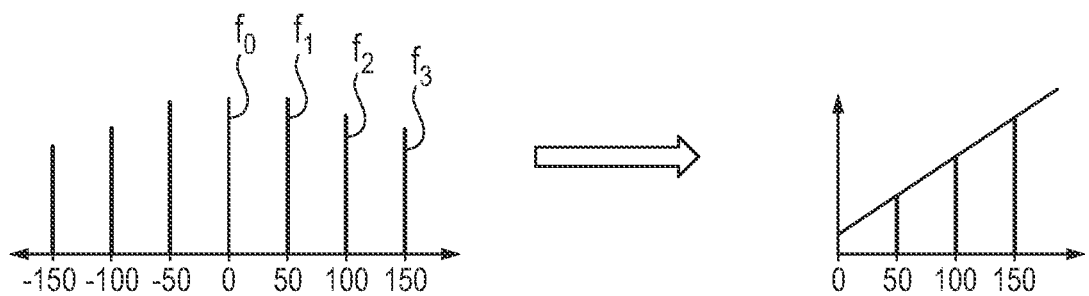
FIG. 6 shows a schematic representation of the measurement of a phase difference according to a heterodyne measurement.
Figure 7:
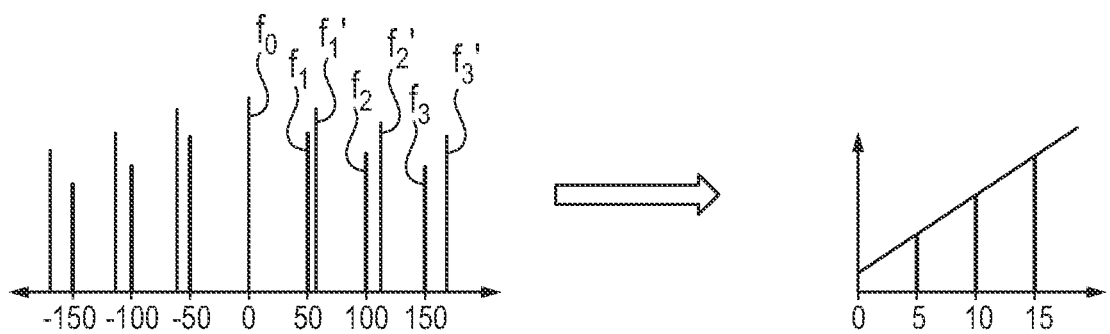
FIG. 7 shows a further schematic representation of the measurement of a phase difference according to a heterodyne measurement.

In FIG. 6 and FIG. 7, the measurement of the phase difference is again schematically illustrated. In FIG. 6, a plurality of modes in the frequency space is illustrated on the left, wherein the frequency is plotted in arbitrary units on the abscissa. A mode of the local oscillator signal has a frequency $f_0$ and three exemplary modes of the measurement signal have frequencies $f_1$, $f_2$ and $f_3$. For example, the modes have a constant distance of fifty to each other. On the right, the phase shift, measured as described, between the mode with the frequency $f_0$ and the modes with the frequencies $f_1$, $f_2$ and $f_3$ is correspondingly plotted as a function of the respective frequency difference to the mode with the frequency $f_0$. The slope of the linear relation provides the distance.

In FIG. 7, a situation is considered, in which the local oscillator signal is slightly detuned such that frequency combs slightly detuned to each other may be examined. The local oscillator signal correspondingly has modes with frequencies $f_0$, $f_{1'}$, $f_{2'}$, and $f_{3'}$, and the measurement signal has modes with the frequencies $f_1$, $f_2$ and $f_3$.

In this case, the mode pairs respectively slightly detuned to each other may be used for determining the respective phase difference. Thus, the phase difference between the mode with the frequency $f_1$ and the mode with the frequency $f_{1'}$ is determined and so on. Accordingly, the frequency differences may be again considerably reduced compared to the situation in FIG. 6, which is beneficial for the simpler electronic signal processing.

As for example described with respect to the FIGS., a measurement of the distance of objects insusceptible to interference with high range and employing inexpensive electronic components is enabled by teachings herein. Some embodiments are based on a quantum-metrological distance measurement by means of two optical partial frequency combs, which are coherently generated from one frequency comb. For example, the reflected signal may be superimposed on a local, not emitted frequency comb at a corresponding photodiode, and the low-frequency beat frequency as well as the phase difference may be measured with a heterodyne detection system. The distance may be determined depending on the beat frequency and the phase.

For example, lidar systems may be operated in the wavelength range between 740 nm and 2000 nm. Thereby, the frequencies of the emitted radiation are in a range between 140 THz and 400 THz, which presents particular challenges to a direct frequency measurement and usually may only be performed with very cost-intensive appliances. The detection of the emitted radiation is for example effected by means of photodiodes, which measure a photocurrent, which is proportional to the absolute square of the received electrical field. Thus, a frequency or phase measurement of the irradiated light source is only unique in the interval from 0 to 180°, the so-called half cycle. The so-called uniqueness length results from it as $c/(2f)$ for the distance of two objects, which may be separately detected. For a wavelength of 1550 nm, a uniqueness length of 777 nm would result. However, the uniqueness length becomes great for decreasing frequencies f. For frequencies in the MHz range, values for the uniqueness length may be achieved, which comply with the requirements for automatic drive functions and may for example be greater than 100 m. Because of these frequencies in the MHz range, it may be resorted to inexpensive electronics for signal processing.

In some embodiments, the THz radiation is effectively frequency-converted and used for distance measurement. In pulsed laser systems, the repetition rate may usually be in the MHz range or below. The frequency of the individual modes is then for example in the THz range, but the frequency distance of the comb modes is in the MHz range or below. By the measurement of difference frequencies of two modes, the frequency conversion into the MHz range or below may thus be achieved.

By the heterodyne measurements, differences of photocurrents of two photodiodes may for example be measured. This entails that portions of the photocurrent independent of time are cancelled, which simplifies the evaluation.

The generation of the initial frequency comb and of the initial pulse sequence, respectively, may be generated by a mode-locked laser or by external modulation of a continuous wave signal. In various embodiments, acousto-optical modulators and/or Mach-Zehnder modulators may for example be employed.

In various forms of configuration, the initial pulse sequence may also be optically amplified to achieve the required transmission power. Hereto, erbium-doped fiber amplifiers, EDFA, or optical amplifiers operating on semiconductor basis, SOA, are for example possible.

In various embodiments, the speed of the object in relation to the sensor system may be determined by measurement of the Doppler shift of the downmixed carrier frequency.

LIST OF REFERENCE NUMERALS

1 Active optical sensor system
2 Motor vehicle
3 Object
4, 5 Pulse sequences
4', 5', 4", 5" Reflected portions
6 Laser source
7 Control circuit
8 Evaluation circuit
9 Pulse sequence
9' Frequency spectrum
10a, 10b, 10c, 10d Lens units
11 Optical filter
12, 13 Beam splitter
14, 15 Reference pulse sequences
16, 17 Heterodyne detectors
18 Mirror
19 Beam splitter
20, 21 Photodetectors
22 Optical unit
S0 to S8 Method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for distance measurement using an active optical sensor system, comprising:
    generating an initial pulse sequence with an initial frequency spectrum, which corresponds to a frequency comb, using a laser source, wherein the frequency comb comprises a plurality of modes with a respective mode frequency;
    generating a first pulse sequence with a first frequency spectrum, which corresponds to a first part of the frequency comb, and a first reference pulse sequence with the first frequency spectrum based on the initial pulse sequence;
    generating a second pulse sequence with a second frequency spectrum, which corresponds to a second part of the frequency comb different from the first part, and a second reference pulse sequence with the second frequency spectrum based on the initial pulse sequence;
    emitting the first pulse sequence and the second pulse sequence towards an object;
    determining a first distance of the object from the sensor system using at least one first heterodyne measurement based on the first reference pulse sequence and portions of the first pulse sequence reflected by the object; and
    determining a second distance of the object from the sensor system using at least one second heterodyne measurement based on the second reference pulse sequence and portions of the second pulse sequence reflected by the object.

2. The method of claim 1, wherein
the first part of the frequency comb includes modes of the frequency comb, the mode frequencies of which are smaller than a preset limit frequency; and
the second part of the frequency comb includes modes of the frequency comb, the mode frequencies of which are greater than the limit frequency.

3. The method of claim 1, comprising:
filtering the initial pulse sequence frequency-dependently to generate a first intermediate pulse sequence with the first frequency spectrum and a second intermediate pulse sequence with the second frequency spectrum;
splitting the first intermediate pulse sequence into the first pulse sequence and the first reference pulse sequence; and
splitting the second intermediate pulse sequence into the second pulse sequence and the second reference pulse sequence.

4. The method of claim 1, comprising:
determining a first phase difference between a mode of the first reference pulse sequence and a mode of the portions of the first pulse sequence reflected by the object by the at least one first heterodyne measurement, wherein the first distance is determined depending on the first phase difference; and/or
determining a second phase difference between a mode of the second reference pulse sequence and a mode of the portions of the second pulse sequence reflected by the object by the at least one second heterodyne measurement, wherein the second distance is determined depending on the second phase difference.

5. The method of claim 1, comprising:
determining a respective first phase difference and a respective first frequency difference by the at least one first heterodyne measurement for a plurality of first mode pairs, wherein each of the first mode pairs is composed of a mode of the first reference pulse sequence and a mode of the portions of the first pulse sequence reflected by the object, wherein the first distance is determined by linear approximation of the first phase differences as a function of the first frequency differences; and
determining a respective second phase difference and a respective second frequency difference by the at least one second heterodyne measurement for a plurality of second mode pairs, wherein each of the second mode pairs is composed of a mode of the second reference pulse sequence and a mode of the portions of the second pulse sequence reflected by the object, wherein the second distance is determined by linear approximation of the second phase differences as a function of the second frequency differences.

6. The method of claim 1, wherein
the initial pulse sequence is generated with a preset repetition frequency, which is in a range from 1 kHz to 1 GHz or is in a range from 100 kHz to 500 MHz or in a range from 500 kHz to 100 MHz; and/or
the initial pulse sequence is generated with a central wavelength in a range from 740 nm to 2000 nm.

7. An active optical sensor system for distance measurement, comprising a laser source and a control circuit, which is configured to control the laser source for generating an initial pulse sequence with an initial frequency spectrum, which corresponds to a frequency comb, wherein
the sensor system comprises an optical system, which is configured and arranged to generate a first pulse sequence with a first frequency spectrum, which corresponds to a first part of the frequency comb, and a first reference pulse sequence with the first frequency spectrum based on the initial pulse sequence;
the optical system is configured and arranged to generate a second pulse sequence with a second frequency spectrum, which corresponds to a second part of the frequency comb different from the first part, and a second reference pulse sequence with the second frequency spectrum based on the initial pulse sequence;
the optical system is configured and arranged to emit the first pulse sequence and the second pulse sequence towards an object;
the sensor system comprises a first heterodyne detector, which is configured and arranged to generate at least one first electrical signal based on the first reference pulse sequence and portions of the first pulse sequence reflected by the object;
the sensor system comprises a second heterodyne detector, which is configured and arranged to generate at least one second electrical signal based on the second reference pulse sequence and portions of the second pulse sequence reflected by the object; and
the sensor system comprises an evaluation circuit, which is configured to determine a first distance of the object from the sensor system depending on the at least one first electrical signal and to determine a second distance of the object from the sensor system depending on the at least one second electrical signal.

8. The active optical sensor system of claim 7, wherein the laser source includes a mode-locked laser.

9. The active optical sensor system of claim 7, wherein the optical system comprises an optical filter, which is configured and arranged to filter the initial pulse sequence frequency-dependently, to generate a first intermediate pulse sequence with the first frequency spectrum and a second intermediate pulse sequence with the second frequency spectrum.

10. The active optical sensor system of claim 9, wherein
the optical system comprises a first beam splitter, which is arranged to split the first intermediate pulse sequence into the first pulse sequence and the first reference pulse sequence; and/or
the optical system comprises a second beam splitter, which is arranged to split the second intermediate pulse sequence into the second pulse sequence and the second reference pulse sequence.

11. The method of claim 2, comprising:
filtering the initial pulse sequence frequency-dependently to generate a first intermediate pulse sequence with the first frequency spectrum and a second intermediate pulse sequence with the second frequency spectrum;
splitting the first intermediate pulse sequence into the first pulse sequence and the first reference pulse sequence; and
splitting the second intermediate pulse sequence into the second pulse sequence and the second reference pulse sequence.

12. The method of claim 2, comprising:
determining a first phase difference between a mode of the first reference pulse sequence and a mode of the portions of the first pulse sequence reflected by the object by the at least one first heterodyne measurement, wherein the first distance is determined depending on the first phase difference; and/or
determining a second phase difference between a mode of the second reference pulse sequence and a mode of the portions of the second pulse sequence reflected by the object by the at least one second heterodyne measurement, wherein the second distance is determined depending on the second phase difference.

13. The method of claim 3, comprising:
determining a first phase difference between a mode of the first reference pulse sequence and a mode of the portions of the first pulse sequence reflected by the object by the at least one first heterodyne measurement, wherein the first distance is determined depending on the first phase difference; and/or
determining a second phase difference between a mode of the second reference pulse sequence and a mode of the portions of the second pulse sequence reflected by the object by the at least one second heterodyne measurement, wherein the second distance is determined depending on the second phase difference.

14. The method of claim 2, comprising:
determining a respective first phase difference and a respective first frequency difference by the at least one first heterodyne measurement for a plurality of first mode pairs, wherein each of the first mode pairs is composed of a mode of the first reference pulse sequence and a mode of the portions of the first pulse sequence reflected by the object, wherein the first distance is determined by linear approximation of the first phase differences as a function of the first frequency differences; and
determining a respective second phase difference and a respective second frequency difference by the at least one second heterodyne measurement for a plurality of second mode pairs, wherein each of the second mode pairs is composed of a mode of the second reference pulse sequence and a mode of the portions of the second pulse sequence reflected by the object, wherein the second distance is determined by linear approximation of the second phase differences as a function of the second frequency differences.

15. The method of claim 3, comprising:
determining a respective first phase difference and a respective first frequency difference by the at least one first heterodyne measurement for a plurality of first mode pairs, wherein each of the first mode pairs is composed of a mode of the first reference pulse sequence and a mode of the portions of the first pulse sequence reflected by the object, wherein the first distance is determined by linear approximation of the first phase differences as a function of the first frequency differences; and
determining a respective second phase difference and a respective second frequency difference by the at least one second heterodyne measurement for a plurality of second mode pairs, wherein each of the second mode pairs is composed of a mode of the second reference pulse sequence and a mode of the portions of the second pulse sequence reflected by the object, wherein the second distance is determined by linear approximation of the second phase differences as a function of the second frequency differences.

16. The method of claim 2, wherein
the initial pulse sequence is generated with a preset repetition frequency, which is in a range from 1 kHz to 1 GHz or is in a range from 100 kHz to 500 MHz or in a range from 500 kHz to 100 MHz; and/or
the initial pulse sequence is generated with a central wavelength in a range from 740 nm to 2000 nm.

17. The method of claim 3, wherein
the initial pulse sequence is generated with a preset repetition frequency, which is in a range from 1 kHz to 1 GHz or is in a range from 100 kHz to 500 MHz or in a range from 500 kHz to 100 MHz; and/or
the initial pulse sequence is generated with a central wavelength in a range from 740 nm to 2000 nm.

18. The method of claim 4, wherein
the initial pulse sequence is generated with a preset repetition frequency, which is in a range from 1 kHz to 1 GHz or is in a range from 100 kHz to 500 MHz or in a range from 500 kHz to 100 MHz; and/or
the initial pulse sequence is generated with a central wavelength in a range from 740 nm to 2000 nm.

19. The method of claim 5, wherein
the initial pulse sequence is generated with a preset repetition frequency, which is in a range from 1 kHz to 1 GHz or is in a range from 100 kHz to 500 MHz or in a range from 500 kHz to 100 MHz; and/or
the initial pulse sequence is generated with a central wavelength in a range from 740 nm to 2000 nm.

20. The active optical sensor system of claim 8, wherein the optical system comprises an optical filter, which is configured and arranged to filter the initial pulse sequence frequency-dependently, to generate a first intermediate pulse sequence with the first frequency spectrum and a second intermediate pulse sequence with the second frequency spectrum.

* * * * *